(12) United States Patent
Buican et al.

(10) Patent No.: US 6,236,563 B1
(45) Date of Patent: May 22, 2001

(54) RETENTION APPARATUS FOR A PERIPHERAL DEVICE

(75) Inventors: Eugene Buican; Roger A. Siedow; Timothy James McNulty, all of Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/345,460

(22) Filed: Jun. 30, 1999

(51) Int. Cl.[7] .............................. H05K 5/00; H05K 7/00; H05K 5/02
(52) U.S. Cl. .................... 361/685; 361/728; 361/747; 361/725; 312/333
(58) Field of Search ................................ 361/683–686, 361/724, 725, 728, 747; 312/332.1, 333, 223.1, 223.2, 251.1; 248/240, 291.1, 225.11

(56) References Cited

U.S. PATENT DOCUMENTS

| | | | |
|---|---|---|---|
| 4,431,717 | * 2/1984 | Kikuchi | 429/100 |
| 5,032,952 | * 7/1991 | Cooke et al. | 361/392 |
| 5,136,466 | * 8/1992 | Remise et al. | 361/391 |
| 5,172,305 | * 12/1992 | DeWilde | 361/415 |
| 5,277,615 | * 1/1994 | Hastings et al. | 439/377 |
| 5,280,398 | * 1/1994 | Wade et al. | 360/60 |
| 5,305,180 | * 4/1994 | Mitchell et al. | 361/685 |
| 5,306,079 | 4/1994 | Liu . | |
| 5,553,412 | * 9/1996 | Briechle et al. | 40/642 |
| 5,566,383 | * 10/1996 | Gildea et al. | 361/685 |
| 5,680,293 | * 10/1997 | McAnally et al. | 361/685 |
| 5,751,545 | * 5/1998 | Jung | 361/683 |
| 5,768,099 | 6/1998 | Radloff et al. . | |
| 5,777,845 | * 7/1998 | Krum et al. | 361/685 |
| 5,808,864 | * 9/1998 | Jung | 361/685 |
| 6,040,980 | * 3/2000 | Johnson | 361/685 |
| 6,049,963 | * 4/2000 | Boe | 29/525.01 |

FOREIGN PATENT DOCUMENTS 6-236669 * 8/1994 (JP) .................................. 369/263

* cited by examiner

*Primary Examiner*—Leo P. Picard
*Assistant Examiner*—Anatoly Vortman
(74) *Attorney, Agent, or Firm*—Haynes and Boone, L.L.P.

(57) ABSTRACT

A computer system including a chassis having a plurality of walls forming a cavity. The computer system further includes a peripheral device positioned in the cavity. A retention clip movable between an open position and a closed position is attached to one of the walls. The retention clip includes an arm portion and a retention flange. The retention clip retains the peripheral device in a supported position relative to the chassis when in the closed position so that a fastener member can be engaged with the peripheral device.

18 Claims, 2 Drawing Sheets

RETENTION APPARATUS FOR A PERIPHERAL DEVICE

BACKGROUND

The disclosures herein relate generally to computer systems and more particularly to a retention apparatus for a peripheral device such as a hard disk drive.

During the installation and removal of a hard disk drive, the drive is susceptible to falling from its mounting bracket if not manually or otherwise supported between the various installation or removal steps. The drive can fall during installation between the time it is placed on the mounting bracket and when the fasteners are installed, or during removal between the time that the fasteners are removed and the drive is removed from the mounting bracket.

Upon falling, the impact of landing can cause serious damage to the drive or other system components. If the impact is great enough, one or more of the heads in the disk drive may experience an impact-induced head crash. An impact-induced head crash occurs when one or more of the heads collide against the surface of an adjacent disk as a result of the disk drive unit being subjected to an excessive impact. A head crash may damage the head or the disk, resulting in reduced performance and reliability. The damage may result in immediate failure or undetected damage leading to a shortened operating life.

Various mounting methods have been devised for hard disk drives. U.S. Pat. No. 5,306,079 is directed to a multi-purpose frame for a computer which comprises floppy disk seats and hard disk seats. The front end of the frame is provided with side hooks, front hooks and a downward urging retainer. The side portion of the frame is provided with interface card hooks, and the rear lower portion thereof is provided with a pair of L-shaped strips. Each of the hard disk seats is provided with fastening hooks and a resilient retainer, and one of the floppy disk seats is provided with dovetail grooves having a recess located therebetween. The frame facilitates the dismounting and replacing of the disk drives, which may be mounted to or dismounted from the computer base conveniently.

U.S. Pat. No. 5,768,099 is directed to a computer, or other similar type of electronic device including a chassis, and one or more disk drives mounted in the chassis. A mounting bracket for receiving a disk drive is mounted to the computer chassis and is precisely located relative to a wall of the chassis. A mounting plate for receiving another disk drive is mounted relative to the bracket and to the chassis and is also precisely located relative to a wall of the chassis and to the bracket.

Accordingly, there is a need for a retention device for temporarily retaining and positioning a peripheral device in the chassis of a computer system that overcomes the shortcomings of present installation apparatus and techniques.

SUMMARY

One embodiment, accordingly, provides a method and apparatus for positioning the peripheral device relative to the chassis. To this end, one embodiment provides a mounting system including a chassis having a plurality of walls. A mounting flange is attached to one of the walls for supporting a peripheral device positioned thereon. A retention clip, movable between an open position and a closed position, is attached to one of the walls. The retention clip is for retaining the peripheral device in a supported position on the mounting flange.

A principal advantage of the embodiments of the temporary retention apparatus presented herein is the reduced potential for damage to the peripheral device and other computer components due to the peripheral device falling from the mounting bracket during the installation.

BRIEF DESCRIPTION OF THE DRAWING FIGURES

DETAILED DESCRIPTION

Figure 1:
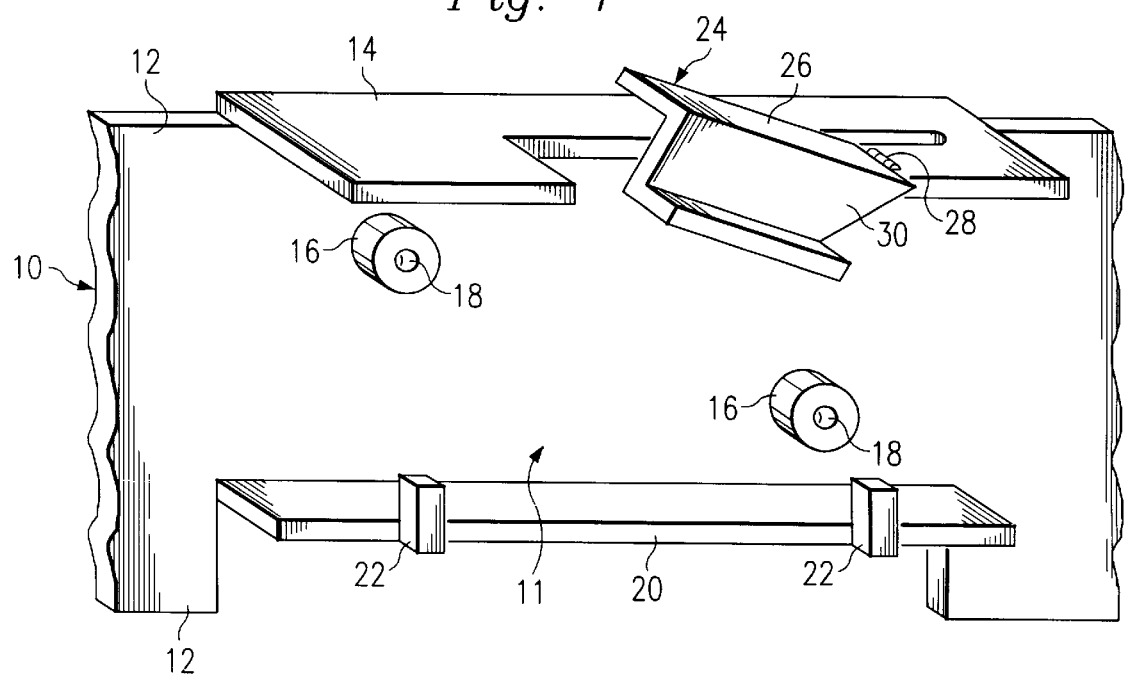
FIG. 1 is a partial perspective view illustrating an embodiment of a computer system chassis having an integral positioning clip.

An embodiment of a chassis 10, FIG. 1, is used in a device such as a computer system. The chassis 10 includes a plurality of walls that form a cavity 11 for receiving a peripheral device therein. The plurality of walls includes a main wall 12 and a side wall 14 extending generally perpendicular from the main wall 12. The main wall 12 includes a plurality of raised mounting portions 16. Each raised mounting portion 16 includes a hole 18 formed therethrough. A mounting flange 20 having a pair of pins 22 extends generally perpendicular from the main wall 12.

Techniques and materials for chassis fabrication are well known. Furthermore, conventional chassis are commercially available from a number of sources such as Palo Alto Products International and from FoxConn Corporation. Typically, a chassis is fabricated from thin sheets of steel or aluminum using conventional metal bending and punching processes.

A retention clip 24, FIG. 1, is attached to the side wall 14. The retention clip 24 includes an arm portion 26 pivotally connected to the side wall 14 by means such as a hinge point 28. The retention clip 24 further includes a retention flange 30 extending from the arm portion 26.

As shown in FIG. 1, the retention clip 24 may be a unitary feature of the chassis 10. It is preferable for the retention clip 24 to be formed with side wall 14 of chassis 10 so that pivotal movement results from bending clip 24 relative to side wall 14. However, the retention, clip 24 may also be formed separately from the chassis 10 and attached to it using a variety of different fastening or hinge techniques such as threaded fasteners, rivets or the like. A primary benefit of the retention clip 24 and the chassis 10 being unitary is that the additional cost of forming the retention clip 24 simultaneously with the chassis 10 is negligible.

Figure 2:
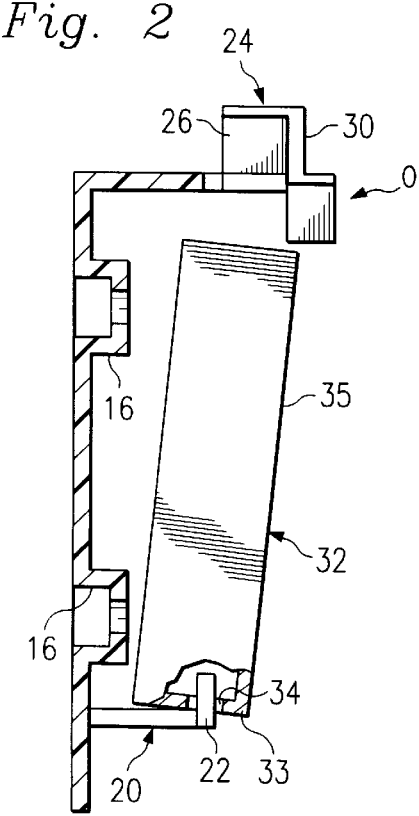
FIG. 2 is a cross-sectional end view illustrating an embodiment of a peripheral device positioned on the mounting apparatus with a positioning clip in a first position.
Figure 3:
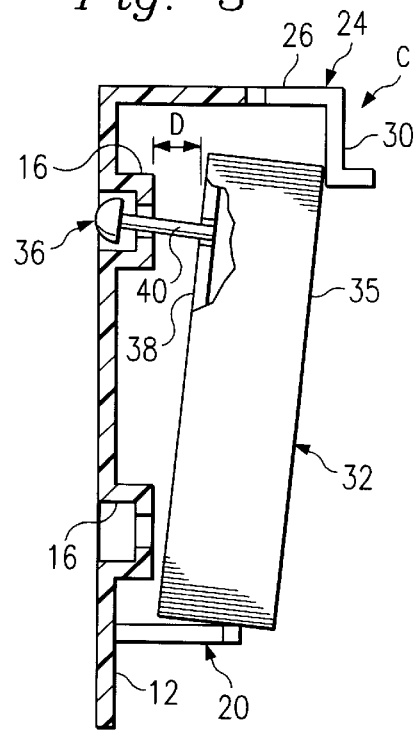
FIG. 3 is a cross-sectional end view illustrating an embodiment of a peripheral device positioned on the mounting apparatus with a positioning clip in a second position.

A peripheral device 32, such as a hard disk drive, is positioned with a first side 33 adjacent the mounting flange 20, FIGS. 2 and 3. The pins 22 of the mounting flange 20 are received in respective holes 34 formed in the peripheral device 32. The retention clip 24 is movable between an open position O, FIG. 2, and a closed position C, FIG. 3.

In the open position O, FIG. 2, the peripheral device 32 may be mounted on one or more of the pins 22. In the closed position C, FIG. 3, the retention flange 30 engages a side 35 of the peripheral device 32 such that the peripheral device 32 is captured between the retention flange 30 of the retention clip 24 and the main wall 12. This limits the potential for the peripheral device 32 falling from the flange 20 prior to the peripheral device 32 being rigidly mounted to the main wall 12.

The retention clip 24 is configured such that when the retention clip 24 is in the closed position C, manual manipulation of the peripheral device 32 is not required to engage a fastener 36 such as a screw into the peripheral device 32. One solution for accomplishing this is to configure the raised mounting portion 16 and the retention clip 24 such that the distance D from the raised mounting portion 16 to a respective mounting hole 38 is less than the length of the shank 40 of the fastener 36.

Figure 4:
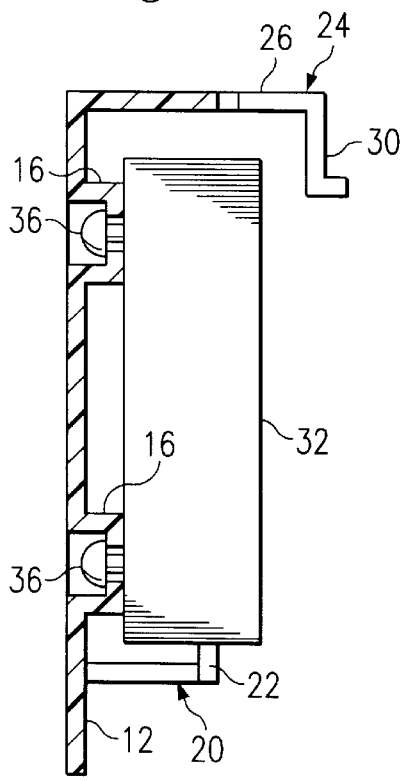
FIG. 4 is a cross-sectional end view illustrating an embodiment of a peripheral device mounted rigidly against the chassis.

The peripheral device 32 is illustrated in FIG. 4, rigidly mounted to main wall 12. The peripheral device 32 is engaged against the raised mounting portions 16 of the main wall 12. Although the raised mounting portions 16, pins 22 and the fasteners 36 are illustrated, other suitable mounting configurations accomplishing the same function are contemplated.

Figure 5:
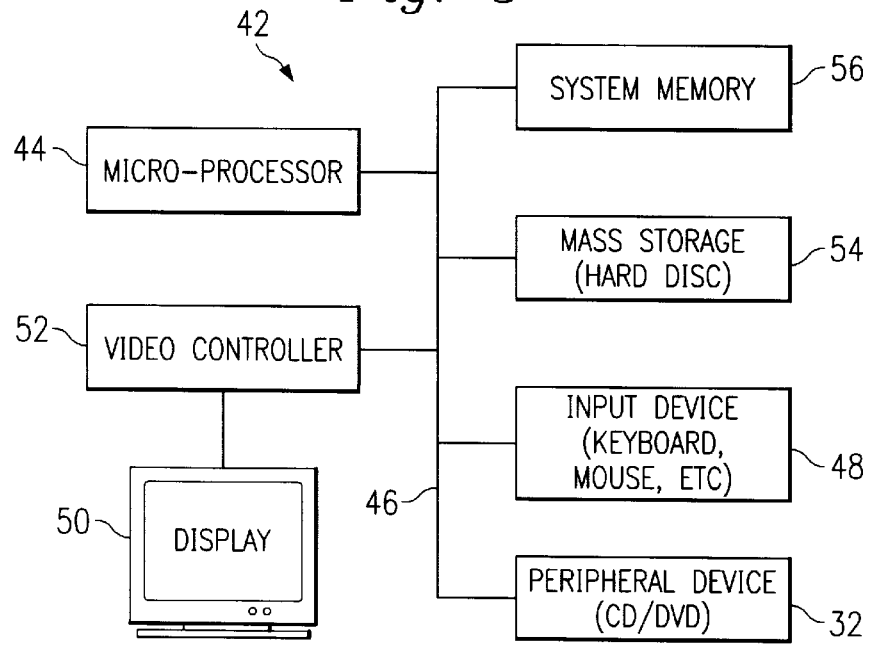
FIG. 5 is a block diagram illustrating an embodiment of a computer system.

An embodiment of a computer system is indicated generally at 42 in FIG. 5. The computer system 42 includes at least one microprocessor 44 that is mounted in a chassis. The microprocessor 44 is connected to a bus 46. The bus 46 serves as a connection between the microprocessor 44 and other components of the computer system 42. An input device 48 is coupled to the microprocessor 44 to provide input to the microprocessor 44. Examples of input devices include keyboards, touchscreens, and pointing devices such as a mouse, a trackball and a trackpad. The computer system 42 further includes a display 50 which is coupled to the microprocessor 44 typically by a video controller 52. Programs and data are stored on a mass storage device 54 which is coupled to the microprocessor 44. Mass storage devices include components such as hard disks, optical disks, magneto-optical drives, floppy drives, and the like. A system memory 56 provides the microprocessor 44 with fast storage to facilitate execution of computer programs by the microprocessor 44. A peripheral device 32 for providing the computer system 42 with additional functionality may be connected to the microprocessor 44. Examples of peripheral devices include floppy disk drives, hard disk drives, compact disc players, digital video disc players, memory card readers, and other devices. The various components of the computer system are typically mounted in a chassis. It should be understood that other busses and intermediate circuits can be employed between the components described above and microprocessor 44 to facilitate interconnection between the components and the microprocessor.

In operation, a side of the peripheral device is pivotally engaged with a mounting bracket that is attached to the computer system chassis. The peripheral device is pivotally moved to a mounting position by bringing a respective face of the peripheral device into engagement with the raised mounting portions of the main wall. The retention clip is moved from an open position to a closed position. In the closed position, the retention clip engages the peripheral device to prevent the peripheral device from falling from the mounting bracket. The retention clip also positions the peripheral device such that fasteners, such as screws, can be fastened into the peripheral device through a wall of the chassis without requiring further manual manipulation of the peripheral device.

One embodiment provides a mounting system including a chassis having a plurality of walls. A mounting flange is attached to one of the walls for supporting a peripheral device positioned thereon. A retention clip, movable between an open position and a closed position, is attached to one of the walls. The retention clip retains the peripheral device in a supported position on the mounting flange.

Another embodiment provides a peripheral support system including a chassis having a plurality of walls forming a cavity. A peripheral device is positioned in the cavity. A retention clip, movable between an open position and a closed position, is attached to one of the walls. The retention clip retains the peripheral device in a supported position within the cavity when in the closed position.

Yet another embodiment provides a computer system including a chassis having a plurality of walls forming a cavity. The computer system further includes a microprocessor mounted in the chassis; an input coupled to provide input to the microprocessor; a mass storage device coupled to the microprocessor; a display coupled to the microprocessor by a video controller; a system memory coupled to provide storage to facilitate execution of computer programs by the microprocessor; and a peripheral device positioned in the cavity. A retention clip, movable between an open position and a closed position, is attached to one of the walls. The retention clip retains the peripheral device in a supported position within the cavity when in the closed position.

A further embodiment provides a method of mounting a device in a computer system including the steps of forming a chassis having a plurality of walls, a mounting flange extending from one of the walls and a retention clip movable between an open position and a closed position attached to one of the walls; attaching a first side of a peripheral device to the mounting flange; and moving the retention clip from the open position to the closed position to engage a second side of the peripheral device to retain the peripheral device in a supported position relative to the chassis.

A still further embodiment provides a method of forming a computer system chassis including the steps of forming a plurality of walls; attaching a mounting flange to one of the walls; and attaching a retention clip to one of the walls, the retention clip being movable between an open position and a closed position for retaining a peripheral device in a supported position relative to the walls when in the closed position.

As it can be seen, the embodiments presented herein provide several advantages. The potential for damage to the peripheral device and other computer components due to the peripheral device falling from its mounting bracket during the installation is reduced. The retention clip can be formed from the parent material of the computer system chassis. The impact applied to the peripheral device in response to moving the retention clip from the open position to the closed position is negligible. A fastener can be attached to the peripheral device through a wall of the chassis without requiring additional manipulation of the peripheral device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A mounting system, comprising:
   a chassis having a plurality of walls;
   a mounting flange attached to one of the walls for supporting a peripheral device positioned thereon;

a mounting portion on another one of the walls; and a retention clip attached to one of the walls for retaining the peripheral device in a supported position on the mounting flange spaced from the mounting portion, the retention clip being movable between an open position and a closed position, whereby a fastener is extended through the mounting portion into engagement with the peripheral device.

2. The mounting system of claim 1 wherein the retention clip is formed with one of the walls.

3. The mounting system of claim 1 wherein the retention clip includes an arm portion and a retention flange, the arm portion being pivotally attached to one of the walls and the retention flange extending from the arm portion.

4. The mounting system of claim 3 wherein the retention flange extends generally perpendicular to the arm portion.

5. The mounting system of claim 1 wherein the plurality of walls forms a cavity for receiving the peripheral device therein.

6. The mounting system of claim 5 wherein the mounting flange is configured to engage a first side of the peripheral device and wherein the retention clip is configured to engage a second side of the peripheral device.

7. The mounting system of claim 5 wherein a fastener can be engaged through one of the plurality of walls into the peripheral device while the peripheral device is engaged with the retention clip.

8. The mounting system of claim 1 wherein the mounting flange includes at least one member upon which the peripheral device can be pivotally mounted.

9. The mounting system of claim 1 wherein the retention clip, the mounting flange and the plurality of walls are unitary.

10. The mounting system of claim 1 wherein the retention clip is attached to the respective one of the walls by a hinge point.

11. The mounting system of claim 10 wherein the hinge point is unitary with the retention clip.

12. A peripheral support system, comprising:

a chassis including a plurality of walls forming a cavity;

a peripheral device positioned in the cavity;

a mounting portion on the chassis adjacent the peripheral device; and a retention clip attached to one of the walls for movement between an open position and a closed position for retaining the peripheral device in a supported position spaced from the mounting portion within the cavity when in the closed position, whereby a fastener extended through the mounting portion is engaged with the peripheral device.

13. The peripheral support system of claim 12 wherein the peripheral device is a hard disk drive.

14. A computer system, comprising:

a chassis including a plurality of walls forming a cavity;

a microprocessor mounted in the chassis;

an input coupled to provide input to the microprocessor;

a mass storage coupled to the microprocessor;

a displayed coupled to the microprocessor by a video controller;

a system memory coupled to provide storage to facilitate execution of computer programs by the microprocessor;

a peripheral device positioned in the cavity;

a mounting portion on the chassis; and a retention clip attached to one of the walls for movable between an open position and a closed position for retaining the peripheral device in a supported position spaced from the mounting portion within the cavity when in the closed position, whereby a fastener extended through the mounting portion is engaged with the peripheral device.

15. A method of mounting a device in a computer system, comprising the steps of:

forming a chassis having a plurality of walls, a mounting flange extending from one of the walls, and a retention clip attached to one of the walls and movable between an open position and a closed position;

providing a mounting portion on the chassis;

attaching a first side of a peripheral device to the mounting flange;

moving the retention clip from the open position to the closed position to engage a second side of the peripheral device to retain the peripheral device in a supported position relative to the chassis and spaced from the mounting portion; and extending a fastener through the mounting portion into engagement with the peripheral device.

16. The method of claim 15 wherein the step of forming the chassis includes the step of forming the retention clip and at least a portion of the plurality of walls to be unitary.

17. The method of claim 15 wherein the step of forming the chassis includes the step of forming an arm portion pivotally attached to one of the walls and a retention flange extending from the arm portion.

18. The method of claim 15 wherein the step of forming the chassis includes the step of forming a cavity for receiving the peripheral device therein.

* * * * *